United States Patent [19]
Schaefer et al.

[11] Patent Number: 5,427,037
[45] Date of Patent: Jun. 27, 1995

[54] METHODS AND APPARATUS USING RELATIVE POWER FACTOR IN INCINERATION OF WASTE

[75] Inventors: Walter R. Schaefer, Cherry Hill, N.J.; Eustathios Vassiliou, Newark, Del.; Joseph F. Guinto, Pitman, N.J.

[73] Assignee: Rollins Environmental Services, Inc., Wilmington, Del.

[21] Appl. No.: 309,665

[22] Filed: Sep. 21, 1994

[51] Int. Cl.⁶ .............................................. F23G 7/00
[52] U.S. Cl. .................................. 110/346; 110/190
[58] Field of Search ............... 110/190, 186, 238, 260, 110/346, 348; 431/12, 13, 14, 75, 89, 90

[56] References Cited
U.S. PATENT DOCUMENTS

| | | | |
|---|---|---|---|
| 3,605,655 | 9/1971 | Warshawsky et al. | 110/8 R |
| 4,038,032 | 7/1977 | Brewer et al. | 23/230 |
| 4,724,775 | 2/1988 | May | 110/186 |
| 4,739,714 | 4/1988 | LaSpisa et al. | 110/187 |
| 4,794,870 | 1/1989 | Visvesvaraya | 110/187 |
| 5,228,398 | 7/1993 | Byerly et al. | 110/246 |
| 5,301,621 | 4/1994 | Vassiliou et al. | 110/346 |

OTHER PUBLICATIONS
U.S. patent application Ser. No. 08/106536 filed Aug. 16, 1993, Class 110; Subclass 346, Inventor: Vassiliou, et al.

Primary Examiner—Denise L. Gromada
Assistant Examiner—Susanne C. Tinker

[57] ABSTRACT

Methods and apparatuses are presented for incinerating waste in increments in a controlled and efficient manner, based on an arbitrary factor labeled Relative Power Factor. Also, presented are methods and apparatuses for determining the Relative Power Factor.

The Relative Power Factor is defined as the ratio of the maximum difference in temperatures recorded at a point in the combustion effluent stream and at a point in the hot gaseous stream prior to combustion to the time interval between ignition of the waste and the achievement of the maximum temperature difference.

31 Claims, 5 Drawing Sheets

METHODS AND APPARATUS USING RELATIVE POWER FACTOR IN INCINERATION OF WASTE

FIELD OF THE INVENTION

This invention relates to methods and apparatuses for incinerating waste in a controlled manner, based on a Relative Power Factor. It also relates to methods and apparatuses for determining the Relative Power Factor.

BACKGROUND OF THE INVENTION

Incinerator kilns, and especially those of the rotary type, have an outside metallic shell, usually steel, the inside of which is fully covered by a thick ceramic or refractory, usually in the form of fire bricks having a total thickness exceeding in many cases 25 cm. These kilns usually operate at a exit gas or off-gas temperature in the range of about 1,600° to 2,400° F. The ceramic or refractory walls, however, are very vulnerable to erosion and corrosion, due to the hostile conditions created by the nature of incinerated materials and high temperatures, especially, if alkali metals are present.

if the viscosity of slag in the kiln is adequately high, it may form a rather thick viscous coating on the refractory and thus protect it from the hostile environment. However, when the viscosity of the slag is very low, the slag contributes to the erosion and corrosion of the ceramic, both chemically because it serves as a solvent and mechanically, as it allows foreign big pieces of abrasive material to act against the ceramic walls. If the slag is viscous to the point of becoming substantially solid, or if it has never been formed as a liquid, it becomes ineffective in promoting combustion of organic matter, and also in capturing toxic heavy metals. Therefore, it is imperative that the viscosity of the slag is very carefully monitored and controlled within a range of values. Thus, one of the objects of this invention is to control the viscosity of the slag in incinerating kilns.

U.S. Pat. No. 5,301,621 (Vassiliou et al.), which is incorporated herein by reference, describes methods and devices for slag viscosity detection through image analysis of dripping slag within rotary incineration kilns.

U.S. Pat. No. 5,228,398 (Byerly et al.), which is also incorporated herein by reference, describes methods and devices for controlling rotary incineration kilns by determining the position of the kiln outlet at which the slag is exiting.

Our U.S. application Ser. No. 08/106,536, which is also incorporated herein by reference, describes preventive slag-viscosity control by detection of alkali metals in the off-gases.

The aforementioned references, however, do not address the problem of uncontrollably raised temperatures in the kiln, which regardless of the presence of alkalis or other factors, are detrimental to the refractory. Not only the slag viscosity decreases drastically at higher temperatures, but also the reactivity of the slag increases accordingly, accompanied by substantial decrease in the resistance of the refractory to chemical and mechanical attack.

The problem is even more profound when the feeding of waste to the kiln is not controllably continuous but it is incremental, which is very often necessary, especially with solid or semisolid waste. "Controllably continuous" means that the waste is initially shredded, blended with other types of waste or additives, and then fed to the kiln by means of screw-type or other type feeder, well known to the art. Incremental feeding is conducted by dropping incremental quantities of waste to the kiln, such as drums and the like, for example, containing waste. Incremental feeding is many times necessary for a number of reasons. One important reason is that the capital equipment cost of shredders and feeders required for continuous feeding of solids or mixtures of solids and liquids is very high, and many environmental facilities do not have such equipment. Another reason is often that it is hazardous and/or highly undesirable to shred certain types of already packaged solid or semisolid waste. Thus, although liquid waste may be introduced to the incinerator in most cases easily by means of appropriate lances, and the like, feeding the incinerator in incremental quantities presents many problems. Control of the kiln temperature in case of liquid waste or even continuous feeding of shredded solid waste is rather easy, since monitoring the temperature at different points of the kiln gives enough information to the operator or to an automatic control device to manipulate the waste feeding rate, the supplementary fuel and the oxidant feeding in order to closely control the temperature, and in general the burning rate. Thus, the burning rate the case of continuous feeding may be controlled just by adjustment of the flow rates of the different aforementioned feeds.

However, after a drum has been dropped into the kiln, it is too late to take any practical measures to control effectively the temperature, in case that the drum happened to contain a large amount of vigorously burning waste. Despite of even completely turning off any supplementary fuel burners and/or liquid waste, uncontrolled burning of the "hot" drum may cause serious problems, such as extreme temperature hikes, unacceptable slag-viscosity decrease, refractory damage, and the like. In some occasions, the release of uncontrolled heat may even reach the proportions of explosion.

Thus, a way to prevent this from occurring is needed.

U.S. Pat. No. 4,724,775 (May) discloses a method and apparatus to control the rate of heat release (ROHR) from a reaction zone confined within a chamber, air and fuel having been introduced into said reaction zone to achieve combustion, plural sensors being utilized, one sensor adapted to sense ROHR, another to generate a target value for a desired ROHR, within a comparator, still another sensor to determine heat generation and transmit it to the comparator, a control means for controlling ROHR of heat generation and connecting said comparator with said control means to achieve coincidence between a target value and said sensed value.

U.S. Pat. No. 4,038,032 (Brewer et al) discloses a control system for the incineration of pollutants in waste gases which will conserve fuel consumption and which embodies feedback signals from temperature sensing means and/or gas analyzing means in connection with the combustion gases to detect an undesired temperature deviation from a control temperature or, alternatively, detect excessive unburned pollutants and utilize optimizing-controller means to receive the resulting output signals and, in turn, provide internal control changes to effect a change in the temperature control level and the incremental stepping down or stepping back of a set point of the control of fuel flow to the heat supplying burner of the incineration zone.

U.S. Pat. No. 4,794,870 (Visvesvaraya) discloses a system for modulating the firing temperature in a rotary kiln. The method comprises determining the absolute content of one or more inorganic constituents present in the coal feed for determining the total ash content in the coal. In the event that the temperature in the kiln is different from the required temperature, then a sweetener fuel is fed to the burner with or without a change in the flow of coal. Alternatively, only the amount of flow of coal to the burner is reduced or increased.

According to U.S. Pat. No. 4,739,714 (LaSpisa et al.), the flow rate of multiple fuel streams supplied to an incinerator are controlled so as to provide maximum temperature and heat release conditions in the incinerator that will allow complete combustion of hazardous waste fuel. In addition, a minimum temperature for the incinerator is maintained by manipulating the flow rate of an auxiliary fuel such as natural gas, that is also supplied to the incinerator. In use, a control signal for manipulating a waste fuel flow is selected as the lowest signal of signals representative of a maximum temperature for the incinerator, a maximum heat release rate for a particular waste fuel, a maximum pressure for the incinerator, and the combustion air available.

U.S. Pat. No. 3,605,655 (Warsshawsky et al) discloses a control system for a fluidized bed reactor which is used for treating material. Although the control system is primarily designed for use with a reactor which is used for incinerating combustible wastes such as sewage sludge, oily wastes such as oily wastes from an oil refining operation or other combustible wastes, it may also be used with a reactor which is being used for other high temperature operations such as calcining operations. Fuel and quench water are supplied to the reactor to maintain a desired temperature within the fluidized bed. The temperature of the fluidized bed is measured and compared to a set temperature. The difference between the actual temperature of the fluidized bed and the desired temperature controls the supply of either fuel or quench water to the reactor to maintain the actual temperature of the bed equal to the desired temperature. A controller responsive to the difference between the desired temperature of the freeboard area and the actual temperature controls the volume of wastes supplied to the reactor.

The aforementioned references attempt to control the temperature in miscellaneous operations, which, however, do not confront the problem of incremental waste feeding or other similar problems, as will be discussed later.

In contrast to the art cited above, the instant invention deals directly and resolves the problems arising from temperature effects, especially in feeding waste in increments.

SUMMARY OF THE INVENTION

As aforementioned, this invention pertains to methods and apparatuses for incinerating waste in a controlled manner, based on a Relative Power Factor and/or a Secondary Relative Power Factor. It also relates to methods and apparatuses for determining the Relative Power Factor. More particularly it pertains to a method of incinerating waste in increments in an incinerator, comprising the steps of:

(a) determining a relative power factor of the waste by
 (i) creating a hot stream of gases adaptable to ignite and burn waste, the stream having a length;
 (ii) introducing a predetermined amount of waste at a first point within the length of the stream;
 (iii) monitoring a first temperature at a second point of the stream located before the first point, and a second temperature at a third point of the stream located after the first point; and
 (iv) correlating the difference between the second temperature and the first temperature with time in order to derive the relative power factor, the relative power factor defined as the ratio of a maximum difference occurring between the second and the first temperature during burning of the waste to a time interval between ignition of the waste and achievement of the maximum temperature difference; and based on the results of step (a):
(b) feeding the waste to the incinerator at such increments that the temperature and oxygen demand in the incinerator do not exceed predetermined values.

It is preferable that the method further comprises a step of allowing the gas stream to achieve a steady state temperature between sub-steps (i) and (ii), and more preferable that the steady state temperature is in the range of 1,600° to 2,000° F.

It is also preferable that the aforementioned first point is closer to the second point than to the third point.

The stream comprises an oxidant, which may be in the form oxygen, air, and the like. It may also contain an inert gas.

The stream may be heated by fuel within the combustion chamber or externally outside the combustion chamber by a heater, for example which in turn may be operated by electricity or by gas for example.

The present invention, also pertains to a method of measuring a relative power factor of waste, comprising the steps of:

(a) creating a hot stream of gases adaptable to ignite and burn waste, the stream having a length;
(b) introducing a predetermined amount of waste at a first point within the length of the stream;
(c) monitoring a first temperature at a second point of the stream located before the first point, and a second temperature at a third point of the stream located after the first point; and
(d) correlating the difference between the second temperature and the first temperature with time in order to derive the relative power factor, the relative power factor defined as the ratio of a maximum difference between the second and the first temperature during burning of the waste to a time interval between ignition of the waste and achievement of the maximum temperature difference.

Further, this invention pertains to an apparatus for measuring a relative power factor of waste, comprising:
an elongate combustion chamber having a front end and a back end opposite the front end;
a waste entry adaptable to feed waste in increments between the front end and the back end;
an oxidant entry at the front end, the oxidant being adaptable to ignite and burn the waste;
an effluent exit at the back end;
a first temperature monitor between the waste entry and the front end;
a second temperature monitor at the back end; and
a first data processor connected to the first and second temperature monitors, the processor being adaptable to relate temperature values provided by the first and second monitors with time, thereby deriving the relative power factor for the waste.

The apparatus may comprise thermal insulation around the combustion chamber, or a jacket around the combustion chamber, the combustion chamber and the jacket confining an annulus.

Preferably, the jacket has a jacket entry in the vicinity of the front end, and a jacket exit in the vicinity of the back end.

Also preferably, the apparatus further comprises a third temperature monitor extending to the annulus in the vicinity of the jacket entry, and a fourth temperature monitor extending to the annulus in the vicinity of the jacket exit.

A fluid, such as water for example, preferably flows in the jacket in a direction from the jacket entry toward the jacket exit.

In a preferable embodiment, the waste entry comprises two doors confining a sample cavity or safety zone and it is closer to the front end than to the back end.

The apparatus may further comprise a second data processor connected to the third and fourth temperature monitors, the second data processor being adaptable to relate temperature values provided by the third and fourth monitors with time, thereby deriving a secondary relative power factor for the waste, the secondary power factor defined as the ratio of a maximum difference between the fourth and the third temperature during burning of the waste to a time interval between starting of rising of the temperature difference and achievement of the maximum temperature difference.

This invention also pertains to an apparatus for measuring a secondary relative power factor of waste, comprising:
- an elongate combustion chamber having a front end and a back end opposite the front end;
- a waste entry adaptable to feed waste in increments between the front end and the back end;
- an oxidant entry at the front end, the oxidant being adaptable to ignite and burn the waste;
- an effluent exit at the back end;
- a jacket around the combustion chamber, the combustion chamber and the jacket confining an annulus, the jacket having a jacket entry in the vicinity of the front end, and a jacket exit in the vicinity of the back end;
- a fluid adaptable to flow in the jacket in a direction from the jacket entry toward the jacket exit;
- a third temperature monitor extending to the annulus in the vicinity of the jacket entry, and a fourth temperature monitor extending to the annulus in the vicinity of the jacket exit; and
- a second data processor connected to the third and fourth temperature monitors, the processor being adaptable to relate temperature values provided by the third and fourth monitors with time, thereby deriving the secondary relative power factor for the waste.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

As aforementioned, this invention pertains to methods and apparatuses for incinerating waste in a controlled manner, based on a Relative Power Factor and/or a Secondary Relative Power Factor. It also relates to methods and apparatuses for determining the Relative Power Factor.

Figure 1:
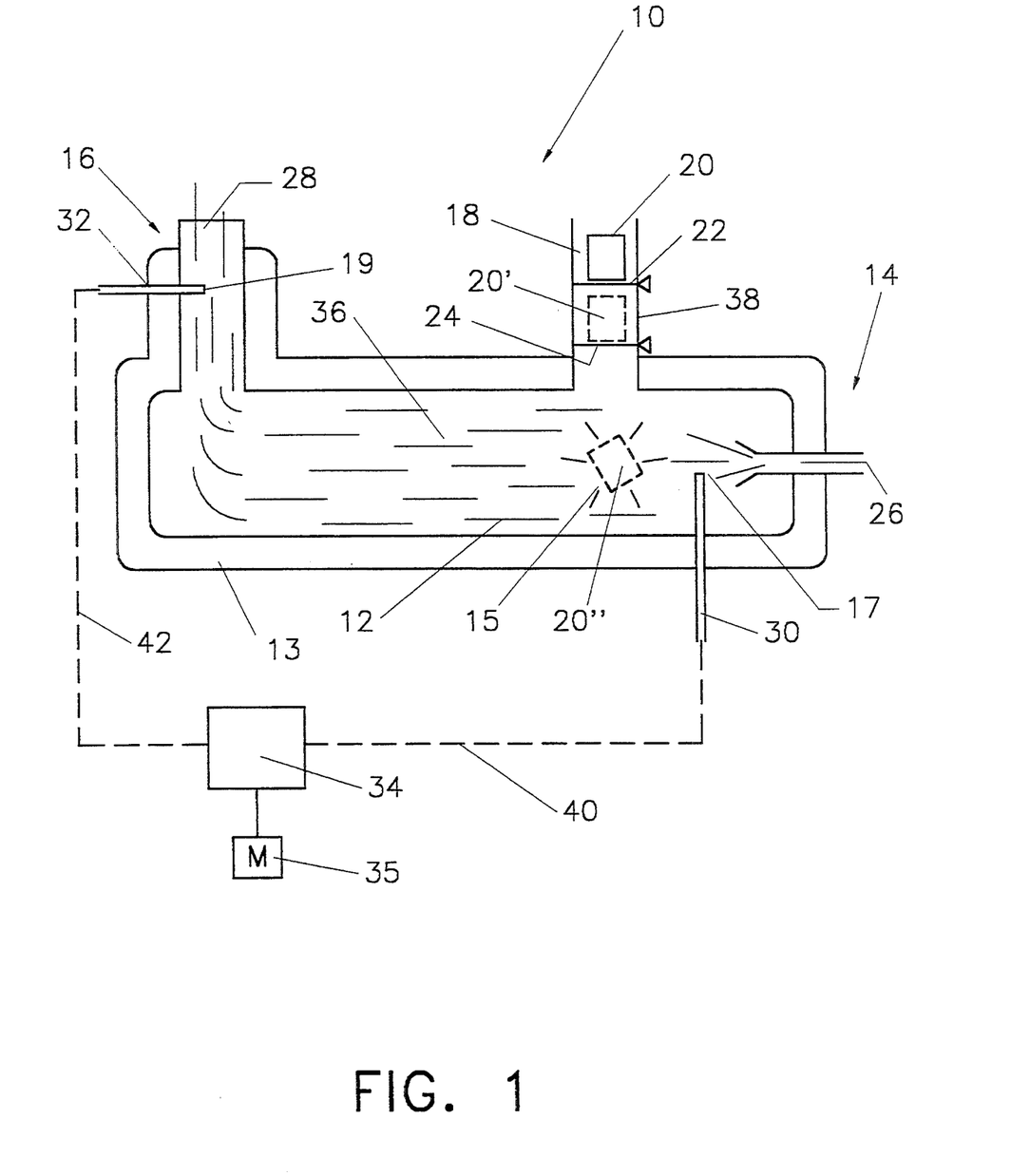
FIG. 1 is a schematic representation of an apparatus of the present invention for measuring the relative power factor of waste.

Referring now to FIG. 1, there is depicted an apparatus 10 for measuring a relative power factor of waste according to a preferred embodiment of the present invention. The definition of the relative power factor will become evident in the following discussion.

Apparatus 10 comprises an elongate combustion chamber 12, which has a front end 14 and a back end 16 opposite the front end 14. Preferably, the combustion chamber 12, in the present embodiment of this invention, is surrounded by thermal insulation 13.

The apparatus 10 also has a waste entry 18, which is adaptable to feed waste in increments 20. The waste entry 18 is located between the front end 14 and the back end 16 of the apparatus 10.

Preferably, the waste entry 18 is located closer to the front end 14 than to the back end 16, and it comprises a first slide gate 22 and a second slide gate 24. The purpose of the slide gates 22 and 24 is to allow the waste 20 to enter the combustion chamber 12 without leakage of combustion gases to the atmosphere, as it will be explained hereinbelow. The slide gates 22 and 24 may be made of heat resistant metal sheets, well known to the art, which may be preferably thermally insulated, and more preferably also water-cooled in order to protect the samples to be examined from the high temperature of the combustion chamber, and prevent premature ignition. Preferably, gate 24 is connected mechanically or electrically to a timing device (not shown) to control the time sequence with respect to the opening and closing of gate 22 and the residence time of the sample in the safety zone 38.

The apparatus 10 is also provided with an oxidant entry 26 at the front end 14, while an effluent exit 28 is located at the back end 16 of the apparatus 10. The effluent exit 28 is preferably connected to an incinerator unit for complete destruction of any harmful effluent gases to the atmosphere.

The apparatus 10 further comprises a first temperature monitor 30 between the waste entry 18 and the front end 14, and a second temperature monitor 32 at the back end 16, preferably within the effluent exit 28.

The two temperature monitors 30 and 32 are connected to a data processor 34. The processor 34 is adaptable to relate temperature values provided by the first and second monitors 30 and 32 with time, thereby deriving the relative power factor for the waste, as explained in detail hereinbelow. The results may be given at the output device 35, which is connected to data processor 34, as a single number, or as a plot of temperature difference versus time, or both, or in any other suitable form depending on the preference of the operator. Example of output devices are alphanumeric displays, recorders, plotters, and the like. Temperature monitors, such as thermocouples, Infra-Red devices, and the like, as well as data processors and output devices are very well known to the art, and they do not require explanations of their function and operation.

In operation of this embodiment, both first and second slide gates 22 and 24 are initially in a closed position, and the effluent exit 28 is preferably connected to the input of an incinerator (not shown) in order to prevent any possible harmful gases to escape to the atmosphere, as aforementioned.

In sequence, gases entering through entry 26, and comprising an oxidant are allowed to form a stream of hot gases 36 in the combustion chamber 12. The stream 36 has such a temperature and contains such an amount of oxidant, that it is adaptable to ignite the sample 20 when said sample falls in the combustion chamber 12 at a first point 15. The gases may be heated before entering the chamber 12 through entry 26, directly or indirectly, by means of a gas or electric heater (not shown), for example, or they may be heated as they enter the chamber. For example, a combustible gas may be used in combination with an oxidant to enter the chamber though entry 26, which may be in the form of a burner. Regardless of the way the gases enter the chamber 12, it is important to form a stream 36, which is adaptable to ignite the sample when it is introduced to the combustion chamber at a later stage of the operation.

The oxidant may preferably comprise oxygen, and it may be in the form of air, of oxygen enriched gas, or even in the form of substantially pure oxygen. Examples of other gases contained in the stream 36 may be nitrogen, carbon dioxide, other inert gases, as diluents for example, products of combustion, other forms of oxidants, and the like. In order to provide the test with most realistic conditions, however, it is preferable that the oxidant comprises air. When entry 26 is in the form of a fuel burner, an additional entry (not shown for purposes of clarity in the figure) for oxidant, also located at the front end 14 of the combustion chamber 12, may be provided in order to better control the operation.

The temperature of the hot stream 36 is stabilized to have a substantially steady state value, preferably within a range of 1,600°–2,000° F., and more preferably in the range of 1650°–1750° F. The steady state value of the temperature, monitored by the first temperature monitor 30 at a second point 17 is controlled with well known to the art techniques so that preferably it does not deviate more the ±20° F. and more preferably it does not deviate more the ±10° F. from a predetermined value within the aforementioned preferable ranges. The temperature is also controlled in a manner that the difference shown between the second monitor 32 at a third point 19 and the first temperature monitor 30 at the second point 17 has attained a steady value approaching zero as much as possible, depending on the parameters of the apparatus, such as heat loss factors for example, and the like.

The second point 30 is selected such that the temperature of the hot gases has reached a maximum value as compared to the temperature of any other point further down the stream 36 toward the effluent exit 28 and third point 19.

After the temperature has stabilized as indicated above, a test sample in the form of a waste increment 20, initially positioned on the first slide gate 22, is allowed to fall in the safety zone 38, by an operator opening and closing again the first slide gate 22, so that the waste increment receives position 20'. In turn, the waste increment is allowed to fall into chamber 12 and receive position 20", by the operator opening and closing the second slide gate 24.

When the waste increment 20 attains position 20" at the first point 15, it ignites and starts burning due to the high temperature and highly oxidative conditions prevailing in the combustion chamber 12.

Depending on the burning characteristics of the waste increment, the temperature difference exhibited by the second temperature monitor 32 and the first temperature monitor 30 follows different paths when plotted versus time. The first temperature (from the first temperature monitor 30) is fed to the data processor 34 through feed line 40, while the second temperature (from the second temperature monitor 32) is fed to the data processor 34 through feed line 42. The data processor 34 calculates the temperature difference and feeds it to the output device 35, where a curve is plotted with coordinates of temperature difference and time.

Figure 2:
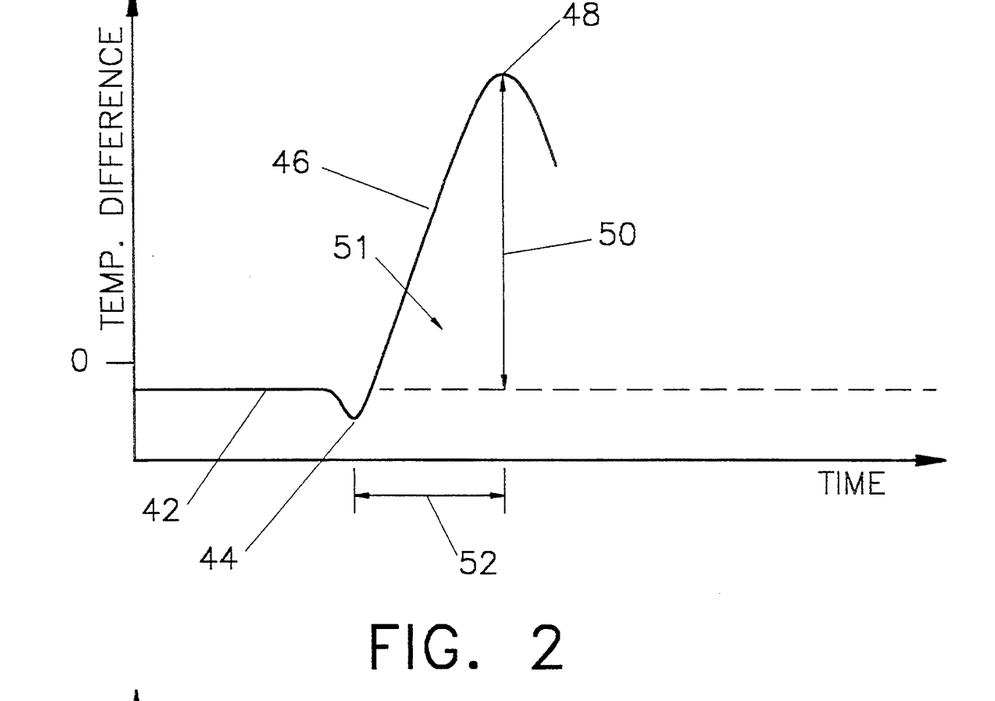
FIG. 2 is a plot of temperature difference versus time in one type of waste, provided by the apparatus of FIG. 1 for determining the relative power factor of the waste.

If the waste, such as acetone for example, burns rather fast, a temperature difference will follow a path similar to the one illustrated in FIG. 2. Due to heat losses, the temperature difference has a negative value, and it follows initially a straight line 42 representing a steady state condition of the stream 36 of hot gases. As soon as the increment of waste 20 falls in position 20" (or first point 15) an initial cooling of the stream takes place decreasing the temperature indication of the second monitor 32. Since the temperature at the second point 17 remains substantially unaffected, a small negative curvature 44 occurs followed by a rapid positive increase 46 having a maximum value 48.

For the purposes of this invention, the relative power factor for the particular waste increment is arbitrarily defined as the ratio of the maximum difference 50 occurring between the second and the first temperature during burning of the waste to the time interval between ignition of the waste and achievement of the maximum temperature difference.

If the output device 35 is a simple alphanumeric instrument, it might accept and display just a number representing the relative power factor. It is, however, preferable to use a recorder or plotter instead of the simple alphanumeric display, since more information is given to the operator by such devices. For example, the area 51 under the raised curve is substantially proportional to the total heat released by the waste increment.

It is very important that the flow rate of the stream 36 has an adequately low value so as to allow the detection of the temperature changes. The higher the flow rate of the stream 36 the lower the maximum temperature difference. However the flow should not be lower than that at which considerable back mixing occurs. A person of ordinary skill in the art may determine a desirable flow rate very easily by testing sample increments of the same material at a few different flow rates and choosing the one that shows better detail, or otherwise fits best the purposes of the operator.

Figure 3:
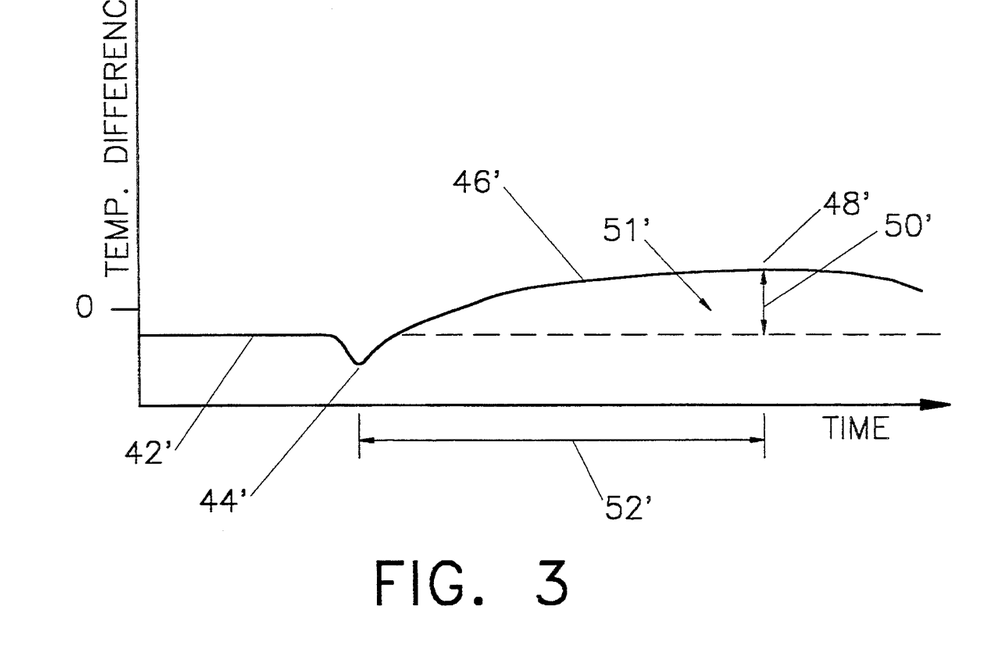
FIG. 3 is a plot of temperature difference versus time in a different type of waste, provided by the apparatus of FIG. 1 for determining the relative power factor of the waste.

FIG. 3 illustrates a similar plot as the one presented in FIG. 2, but for a rather slow burning waste increment, such as wood for example. Elements 42', 44', 46', 48', 50', 51', and 52' in FIG. 3 have the same meaning as elements 42, 44, 46, 48, 50, 51, and 52, respectively.

Figure 4:
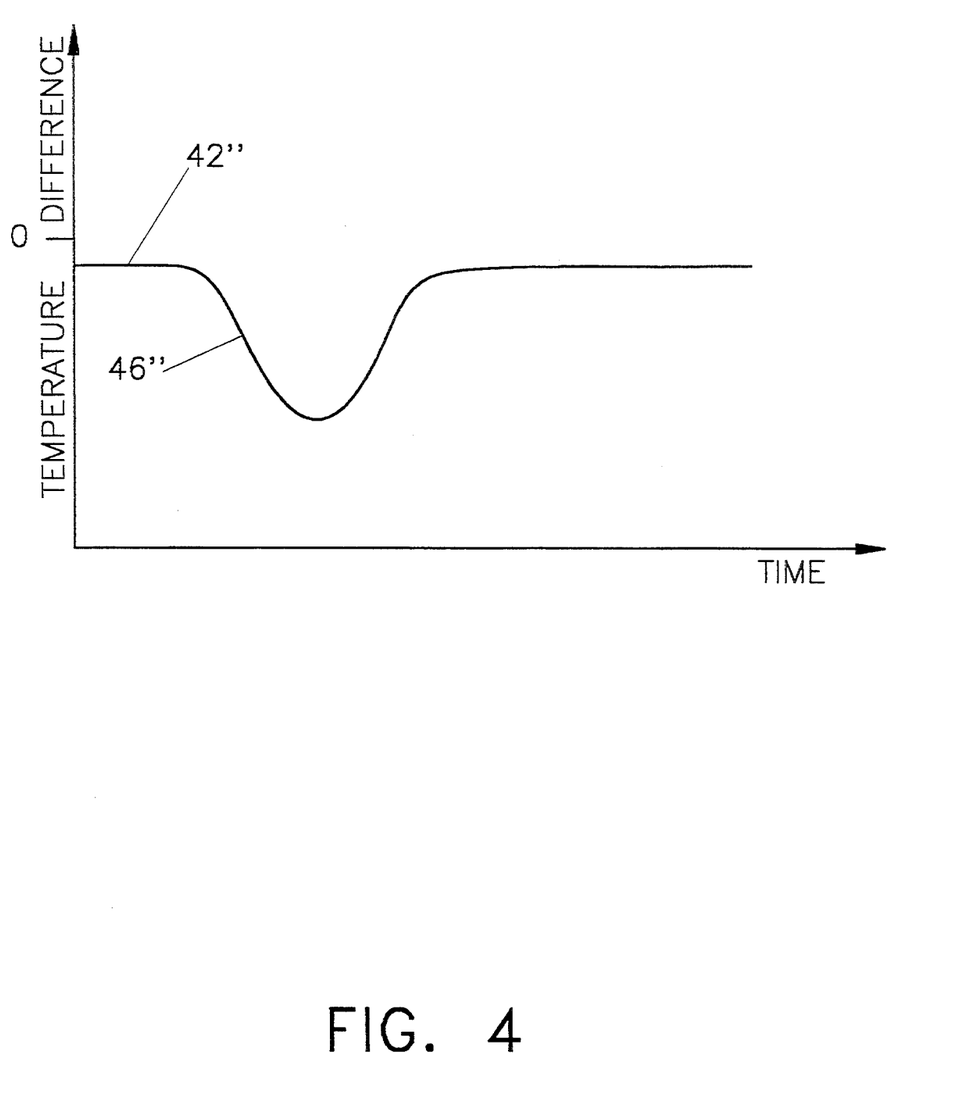
FIG. 4 is a plot of temperature difference versus time in still a different type of waste, provided by the apparatus of FIG. 1 for determining the relative power factor of the waste.

FIG. 4 illustrates a similar plot in the case that the waste increment is not combustible, but it absorbs energy when heated. Such a material is water, for example.

Although this last category falls within the scope of the present invention, the substances of real concern are of the fast burning type illustrated in FIG. 1, and their differentiation based on their corresponding relative power factor.

The term "relative" has been used in the context of this invention to indicate that the power factor is not a property which may be expressed in absolute terms. Depending on the dimensions and other characteristics of any given apparatus as the one described hereinabove, the values received by one such apparatus may be completely different when compared to the values received by a different apparatus. However, the faster burning substances will give higher values than the slower burning substances in any given apparatus. Thus, it is important for an operator to calibrate the apparatus for optimum results and maximum sample differentiation. This may be done very easily by a person of ordinary skill in the art.

It should also be noted that incineration kilns differ substantially from place to place and type to type in the Industry, so that no unique correlation is valid for all types of kilns Therefore, another important calibration is the correlation of the relative power factor of different materials with their burning characteristics in a given incineration kiln. It is important to determine the size of the increments fed to the kiln in order to avoid
  (a) development of excessive temperatures in the kiln, which reduces the slag viscosity and promotes deterioration of the refractory lining of the kiln, and
  (b) starvation from oxygen and creation of unfulfilled high oxygen demand, which results in so called "trips", or automatic shut down of the kiln required by the environmental authorities.

This calibration is very easy to be conducted by a person of ordinary skill in the art. It may be done as follows:

The operator feeds the kiln with increasingly larger increments of waste of predetermined relative power factor at a nominal frequency depending on the particular incinerator. The size of the increment just before ill effects start being observed, as discussed earlier, determines the maximum size increment. If this is done with a few materials of substantially differing values of relative power factor, a curve may be constructed correlating the relative power factor of different waste materials with the maximum incremental feeding permitted for the incinerator under consideration. The operator may also vary the frequency of dropping the different size increments and make similar but more detailed three dimensional correlations with very well known techniques to the art. These three dimensional correlations involve the relative power factor versus size of increment versus frequency of dropping the increments After one of these curves has been constructed, it will be adequate to determine the relative power factor of any type of material or waste, and feed the incinerator in maximum size of increments and or maximum frequency of dropping such increments, thus achieving maximum efficiency.

It should be noted that other parameters, such as oxidant and fuel rate in the kiln may be adjusted, depending on the circumstances. However, their effect is many times of only limited value when feeding in increments is conducted.

Figure 5:
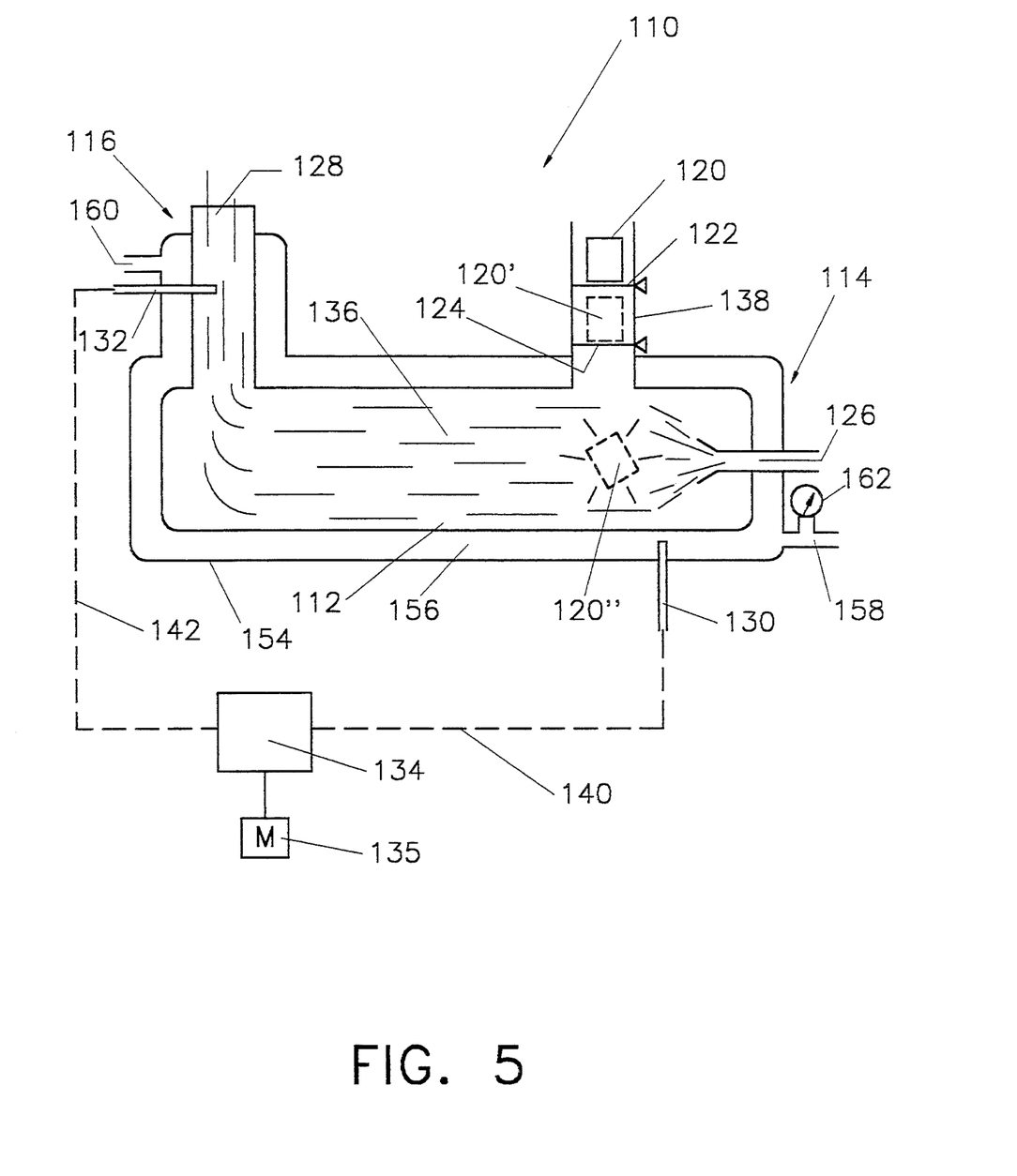
FIG. 5 is a schematic representation of another apparatus of the present invention for measuring the secondary relative power factor of waste.

In a different embodiment of the present invention, better shown in FIG. 5, there is provided a similar arrangement as the one shown in FIG. 1 with a number of differences as described hereinbelow.

In place of the thermal insulation 13 of the embodiment of FIG. 1, there is provided a jacket 154 around the elongate combustion chamber 112. The combustion chamber 112 and the jacket 154 confine an annulus 156. The jacket 154 has a jacket entry 158 in the vicinity of the front end 114, and a jacket exit 160 in the vicinity of back end 116 of the chamber 112. A fluid, preferably water, is forced to flow in the annulus 156 in a direction from the jacket entry 158 toward the jacket exit 160. The flow of the liquid is controlled by a flowmeter 162 to receive a desired value. A third temperature monitor 130 extends to the annulus in the vicinity of the Jacket entry 158, and a fourth temperature monitor 132 extends to the annulus in the vicinity of the jacket exit 160.

The apparatus 110 further comprises a second data processor 134 connected to the third and fourth temperature monitors 130 and 132, respectively. The second data processor 134 is adaptable to relate temperature values provided by the third and fourth monitors with time, thereby deriving a secondary relative power factor for the waste. The secondary relative power factor is defined as the ratio of a maximum difference between the fourth and the third temperature during burning of the waste to a time interval between starting of rising of the temperature difference and achievement of the maximum temperature difference.

Figure 6:
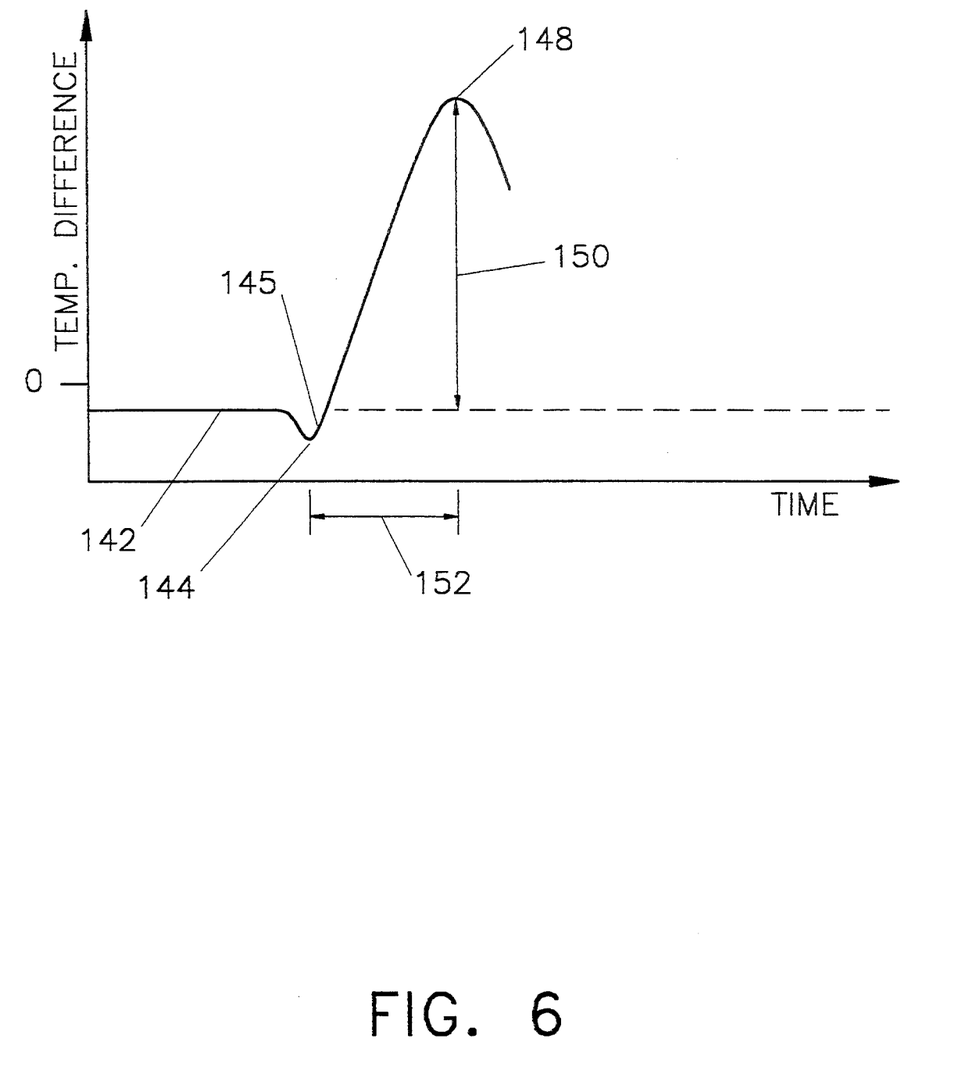
FIG. 6 is a plot of temperature difference versus time provided by the apparatus in FIG. 5 and is used in calculating the secondary relative power factor of the waste.

The operation of this embodiment is similar to the operation of the embodiment of FIG. 1. However, instead of monitoring the gas temperature of the gas stream, the temperatures of the fluid flowing in the annulus 156 are monitored by temperature monitors 130 and 132. It is important that the flow of the fluid, preferably water, has been carefully regulated to attain a steady value, so that the temperature difference is constant and approaches zero. It is also important that the temperatures and other parameters within the elongate combustion chamber have been stabilized by means of temperature monitors and any other controls, well known to the art (not shown for purposes of clarity). The operator, in sequence, introduces the waste increment 120 into the chamber 112, where the sample receives position 120'' and it ignites, as already discussed in the previous embodiment. The temperatures from monitors 130 and 132 are fed to the data processor 134, which in turn feed the results to output device 135 in a similar manner as in the previous embodiment. The plots received have similar appearance as the plots of FIGS. 2–4, as better illustrated in FIG. 6, from which the secondary relative power factor is calculated as the ratio of the maximum temperature difference 150 to the time interval 155 between the starting of temperature rise 145 and the achievement of maximum temperature difference 148.

Examples demonstrating the operation of the instant invention have been given for illustration purposes only, and should not be construed as limiting the scope of this invention in any way. In addition it should be stressed that the preferred embodiments discussed in detail hereinabove, as well as any other embodiments encompassed within the limits of the instant invention, may be practiced individually, or in any combination thereof, according to common sense and/or expert opinion. These combinations also lie within the realm of the present invention. Furthermore, any attempted explanations in the discussion are only speculative and are not intended to narrow the limits of this invention.

In the different figures of the drawing, numerals differing by 100 represent elements which are either substantially the same or perform the same function. Therefore, in the case that one element has been defined once in a certain embodiment, its re-definition in other embodiments illustrated in the figures by the same numerals or numerals differing by 100 is not necessary, and it has been often omitted in the above description for purposes of brevity.

What is claimed is:

1. A method of incinerating waste in increments in an incinerator, comprising the steps of:
   (a) determining a relative power factor of the waste by
      (i) creating a hot stream of gases adaptable to ignite and burn waste, the stream having a length;
      (ii) introducing a predetermined amount of waste at a first point within the length of the stream;
      (iii) monitoring a first temperature at a second point of the stream located before the first point, and a second temperature at a third point of the stream located after the first point; and
      (iv) correlating a difference between the second temperature and the first temperature with time in order to derive the relative power factor, the relative power factor defined as the ratio of a maximum difference occurring between the second and the first temperature during burning of the waste to a time interval between ignition of the waste and achievement of the maximum temperature difference; and based on results of step (a);
   (b) feeding the waste to the incinerator at such increments that the temperature and oxygen demands in the incinerator do not exceed predetermined values.

2. A method as defined in claim 1, further comprising a step of allowing the gas stream to achieve a steady state temperature between sub-steps (i) and (ii).

3. A method as defined in claim 2, wherein the steady state temperature is in a range of 1,600° to 2,000° F.

4. A method as defined in claim 1, wherein the first point is closer to the second point than to the third point.

5. A method as defined in claim 1, wherein the stream comprises oxygen.

6. A method as defined in claim 5, wherein the stream comprises an inert gas.

7. A method as defined in claim 1, wherein the stream comprises air.

8. A method as defined in claim 1, wherein the stream is heated by fuel.

9. A method as defined in claim 1, wherein the stream is externally heated.

10. A method as defined in claim 1, wherein the stream is electrically heated.

11. A method of measuring a relative power factor of waste, comprising the steps of:
   (a) creating a hot stream of gases adaptable to ignite and burn waste, the stream having a length;
   (b) introducing a predetermined amount of waste at a first point within the length of the stream;
   (c) monitoring a first temperature at a second point of the stream located before the first point, and a second temperature at a third point of the stream located after the first point; and
   (d) correlating a difference between the second temperature and the first temperature with time in order to derive the relative power factor, the relative power factor defined as a ratio of a maximum difference between the second and the first temperature during burning of the waste to a time interval between ignition of the waste and achievement of the maximum temperature difference.

12. A method as defined in claim 11, further comprising a step of allowing the gas stream to achieve a steady state temperature between steps (a) and (b).

13. A method as defined in claim 12, wherein the steady state temperature is in a range of 1,600° to 2,000° F.

14. A method as defined in claim 11, wherein the first point is closer to the second point than to the third point.

15. A method as defined in claim 11, wherein the stream comprises oxygen.

16. A method as defined in claim 15, wherein the stream comprises an inert gas.

17. A method as defined in claim 11, wherein the stream comprises air.

18. A method as defined in claim 11, wherein the stream is heated by fuel.

19. A method as defined in claim 11, wherein the stream is externally heated.

20. A method as defined in claim 11, wherein the stream is electrically heated.

21. An apparatus for measuring a relative power factor of waste, comprising:
   an elongate combustion chamber having a front end and a back end opposite the front end;
   a waste entry adaptable to feed waste in increments between the front end and the back end;
   an oxidant entry at the front end, the oxidant being adaptable to ignite and burn the waste;
   an effluent exit at the back end;
   a first temperature monitor between the waste entry and the front end;
   a second temperature monitor at the back end; and
   a first data processor connected to the first and second temperature monitors, the processor being adaptable to relate temperature values provided by the first and second monitors with time, thereby deriving the relative power factor for the waste, defined as a ratio of a maximum difference occurring between temperatures monitored by the second and the first temperature monitors during burning of the waste to a time interval between ignition of the waste and achievement of the maximum temperature difference.

22. An apparatus as defined in claim 21, further comprising thermal insulation around the combustion chamber.

23. An apparatus as defined in claim 21, further comprising a jacket around the combustion chamber, the combustion chamber and the jacket confining an annulus.

24. An apparatus as defined in claim 23, wherein the jacket has a jacket entry in the vicinity of the front end, and a jacket exit in the vicinity of the back end.

25. An apparatus as defined in claim 24, further comprising a third temperature monitor extending to the annulus in the vicinity of the jacket entry, and a fourth temperature monitor extending to the annulus in the vicinity of the jacket exit.

26. An apparatus as defined in claim 24, further comprising a fluid flowing in the jacket in a direction from the jacket entry toward the jacket exit.

27. An apparatus as defined in claim 26, wherein the fluid is water.

28. An apparatus as defined in claim 21, wherein the waste entry comprises two doors confining a sample cavity.

29. An apparatus as defined in claim 25, further comprising a second data processor connected to the third and fourth temperature monitors, the second data processor being adaptable to relate temperature values provided by the third and fourth monitors with time, thereby deriving a secondary relative power factor for the waste, the secondary power factor defined as the ratio of a maximum difference between the fourth and the third temperature during burning of the waste to a time interval between starting of rising of the temperature difference and achievement of the maximum temperature difference.

30. An apparatus as defined in claim 21, wherein the waste entry is closer to the front end than to the back end.

31. An apparatus for measuring a secondary relative power factor of waste, comprising:
   an elongate combustion chamber having a front end and a back end opposite the front end;
   a waste entry adaptable to feed waste in increments between the front end and the back end;
   an oxidant entry at the front end, the oxidant being adaptable to ignite and burn the waste;
   an effluent exit at the back end;
   a jacket around the combustion chamber, the combustion chamber and the jacket confining an annulus, the jacket having a jacket entry in the vicinity of the front end, and a jacket exit in the vicinity of the back end;
   a fluid adaptable to flow in the jacket in a direction from the jacket entry toward the jacket exit;
   a third temperature monitor extending to the annulus in the vicinity of the jacket entry, and a fourth temperature monitor extending to the annulus in the vicinity of the jacket exit; and
   a second data processor connected to the third and fourth temperature monitors, the processor being adaptable to relate temperature values provided by the third and fourth monitors with time, thereby deriving the secondary relative power factor for the waste.

* * * * *